United States Patent [19]

Ho

[11] Patent Number: 5,215,821
[45] Date of Patent: Jun. 1, 1993

[54] SOLID-STATE ELECTROCHROMIC DEVICE WITH PROTON-CONDUCTING POLYMER ELECTROLYTE AND PRUSSIAN BLUE COUNTERELECTRODE

[75] Inventor: Kuo-Chuan Ho, Allison Park, Pa.

[73] Assignee: PPG Industries, Inc., Pittsburgh, Pa.

[21] Appl. No.: 633,895

[22] Filed: Dec. 26, 1990

[51] Int. Cl.$^5$ .............................................. B32B 17/06
[52] U.S. Cl. .................................... 428/432; 428/688; 428/689; 428/697; 359/268; 359/269; 359/275
[58] Field of Search ............... 428/432, 688, 689, 697; 359/268, 269, 275

[56] References Cited

U.S. PATENT DOCUMENTS

| | | | |
|---|---|---|---|
| 4,231,641 | 11/1980 | Randin | 359/269 |
| 4,433,901 | 2/1984 | Takahashi et al. | 359/268 |
| 4,645,307 | 2/1987 | Miyamoto et al. | 350/357 |
| 4,726,664 | 2/1988 | Tada et al. | 350/357 |
| 4,768,865 | 9/1988 | Greenberg et al. | 350/357 |
| 4,773,741 | 9/1988 | Inaba et al. | 350/357 |
| 4,818,352 | 4/1989 | Inaba et al. | 350/357 |

OTHER PUBLICATIONS

Journal of Electroanalytical Chemistry, 252 (1988), pp. 461–466, Kulesza et al.
"Electrochemical and Electrochromic Properties of all Solid-State Tungsten Oxide–Prussian Blue Based Electrochromic Devices" by Oyama et al., *Electrochemical Society of Japan*, vol. 57, pp. 1172–1177 (1989).
"Spectroelectrochemistry and Electrochemical Preparation Method of Prussian Blue Modified Electrodes" by Itaya et al., *Journal of the American Chemical Society*, vol. 104, pp. 4767–4772 (1982).
"Electrochromism in the Mixed–Valence Hexacyanides," *The Journal of Physical Chemistry*, vol. 85, pp. 1225–1231 (1981), Ellis et al.
"Electrochemical Properties of Amorphous Prussian Blue Films Chemically Deposited from Aqueous Solutions" by Yano et al., *Proceedings of the Symposium on Electrochromic Materials*, 90–2, pp. 125–136 (1990).
"Electrochemical Oxidation and Reduction of Thin Films of Prussian Blue", *Journal of the Electrochemical Society*, vol. 125, pp. 886–887 (1978).
"Prussian Blue-Nafion Composite Film and Its Application to a Thin Film Rechargeable Battery," *Progress in Batteries and Solar Cells*, vol. 6, pp. 255–256 (1987), Honda et al.

*Primary Examiner*—Ellis P. Robinson
*Assistant Examiner*—Timothy M. Speer
*Attorney, Agent, or Firm*—Donna L. Seidel

[57] ABSTRACT

A solid-state electrochromic device is disclosed comprising tungsten oxide-Prussian blue complementary configuration in combination with a proton-conducting polymer electrolyte.

8 Claims, 2 Drawing Sheets

SOLID-STATE ELECTROCHROMIC DEVICE WITH PROTON-CONDUCTING POLYMER ELECTROLYTE AND PRUSSIAN BLUE COUNTERELECTRODE

BACKGROUND OF THE INVENTION

The invention relates generally to the field of electrochromic devices which vary in transmittance in response to an electric field, and more particularly to the art of solid-state electrochromic devices which incorporate polymeric electrolytes.

Conventional electrochromic cells comprise a thin film of a persistent electrochromic material, i.e. a material responsive to the application of an electric field of a given polarity to change from a high-transmittance, non-absorbing state to a lower-transmittance, absorbing or reflecting state and remaining in the lower-transmittance state after the electric field is discontinued, preferably until an electric field of reversed polarity is applied to return the material to the high-transmittance state. The electrochromic film is in ion-conductive contact, preferably direct physical contact, with a layer of ion-conductive material. The ion-conductive material may be solid, liquid or gel. The electrochromic film and ion-conductive layers are disposed between two electrodes.

As a voltage is applied across the two electrodes, ions are conducted through the ion-conducting layer. When the electrode adjacent to the electrochromic film is the cathode, application of an electric field causes darkening of the film. Reversing the polarity causes reversal of the electrochromic properties, and the film reverts to its high transmittance state. Typically, the electrochromic film, e.g. tungsten oxide, is deposited on a glass substrate coated with an electroconductive film such as tin oxide to form one electrode. The counter electrode of the prior art has typically been a carbon-paper structure backed by a similar tin oxide coated glass substrate or a metal plate.

While this conventional electrochromic device structure might be acceptable for data displays in items such as digital watches, it is not suitable for large transparent articles such as windows. While the opaque carbon-paper counter electrode may be replaced with a thin conductive film such as tin oxide, indium oxide or gold, these thin film electrodes encounter lateral electrical resistance which decreases the speed and uniformity of charge distribution as the surface area of the device increases. More importantly, with electric fields of about 1 volt, half-cell reactions which result in the evolution of gas from the electrolysis of water occur at the counter electrode, depending on the polarity, as follows:

| Electrode | Reaction | Standard Potential |
|---|---|---|
| Cathode | $2H_2O + 2e^- \longrightarrow H_2 + 2OH^-$ | −0.828 volts |
| Anode | $2H_2O \longrightarrow 4H^+ + O_2 + 4e^-$ | −1.229 volts |

The hydrogen and oxygen gases produced by these reactions form bubbles which impair the optical properties of an electrochromic cell for use as a window.

The use of a metal mesh as the counter electrode is described in U.S. Pat. No. 4,768,865, the disclosure of which is incorporated herein by reference. The invention described therein allows transparency while providing uniform rapid charge distribution over a large surface area and participating in a balancing half-cell reaction at a lower potential which prevents electrolysis of water and concurrent gas evolution which would otherwise occur according to the following reactions, wherein x is typically up to about 0.5:

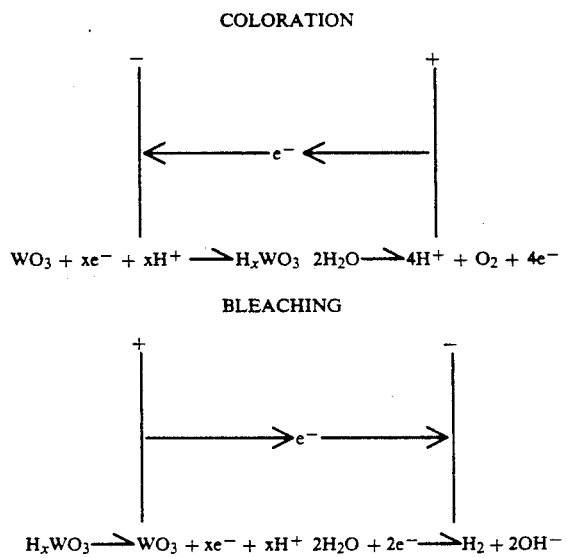

Instead of the hydrolysis of water at the counter electrode, pictured on the right above, the balancing half-cell reaction in response to the electrochromic transition of tungsten oxide is the oxidation or reduction of the metal of the metal grid counter electrode, which does not produce gas which can form bubbles and decrease the optical quality of the device.

U.S. Pat. No. 4,726,664 to Tada et al. discloses an electrochromic device comprising an oxidation coloring substance coloring in an oxidized state and a reduction coloring substance coloring in a reduced state which are formed on the surfaces of a pair of electrodes, respectively, and an electrolyte held between the two substances, wherein the oxidation coloring substance is a double salt containing an iron hexacyanoferrate and the reduction coloring substance is a tungsten-oxalic acid compound.

U.S. Pat. No. 4,645,307 to Miyamoto et al. discloses an electrochromic device having two electrochromic layers respectively formed on oppositely arranged two electrodes and containing an electrolyte such as a solution of an alkali metal salt in an organic solvent which fills up the gap between the two electrodes. The electrochromic layers are formed of an electrochromic material which can alternately and stably exist in three different oxidation states and assumes three different colors in its respective oxidation states such that there is a clear contrast between the color of this material in its normal or intermediate oxidation state and a composite color given by superposition of the color in the highest oxidation state on the color in the lowest oxidation state. Prussian blue is a preferred example of such an electrochromic material, on condition that an adequate amount of water be present in the electrolyte solution or, alternatively, that the Prussian blue layers be pretreated to substitute alkali metal cation for $Fe^{3+}$ interstitially existing in the crystal lattice of Prussian blue.

U.S. Pat. No. 4,773,741 to Inaba et al. discloses an electrochromic display device having a transparent electrode layer coated with a first electrochromic material which takes on color in its electrochemically oxidized state, such as Prussian blue, and an opposite transparent electrode layer coated with a second electrochromic material which takes on color in its reduced state, such as tungsten oxide. For use in initial bleaching or coloration of one of the two electrochromic layers, an auxiliary electrode is disposed in a marginal region of the space between the two opposite electrodes, and an electrolyte occupies the remaining space.

U.S. Pat. No. 4,818,352 to Inaba et al. discloses an electrodeposition method for forming a film of an electrochromically synthesizable and functional substance e.g. Prussian blue, useful as an electrochromic material, on an electrode plate having a conductive coating relatively high in surface resistivity, such as tin dioxide or indium trioxide, by providing the electrode plate with an elongated auxiliary electrode formed of e.g. a metal wire or foil, attached to the outer surface of the conductive coating so as to extend at least along the whole periphery of the electrode plate.

In "Electrochemical and Electrochromic Properties of All Solid-State Tungsten Oxide-Prussian Blue Based Electrochromic Devices" by Oyama et al., *Electrochemical Society of Japan*, Vol. 57, pp. 1172–1177 (1989), electrochromic devices using polymeric solid electrolytes and incorporating tungsten oxide-Prussian blue are disclosed as being prepared by dispersing homogeneous lithium trifluoromethanesulfonate in a hydrogen-bonding type complex of poly(acrylic acid) and poly(ethylene oxide). A reversible color change between blue and colorless was observed when an appropriate voltage was applied repeatedly to the tungsten oxide and Prussian blue coated electrodes. The coloration and bleaching were found to be controlled with the electrochemical reaction of the tungsten oxide electrode which depends on the injection and disintercalation of lithium ions into and out of the tungsten oxide layer.

In "Spectroelectrochemistry and Electrochemical Preparation Method of Prussian Blue Modified Electrodes" by Itaya et al., *Journal of the American Chemical Society*, Vol. 104, pp. 4767–4772 (1982), the details of an electrochemical preparation method for Prussian blue are discussed. The electrochemistry of the Prussian blue-modified electrodes is tested in solutions of various supporting electrolytes such as potassium, ammonium and cesium. A spectroelectrochemical study shows the values of molar extinction efficiency and the absorption spectrum of the fully oxidized form of Prussian blue.

In "Electrochromism in the Mixed-Valence Hexacyanides," *The Journal of Physical Chemistry*, Vol. 85, pp. 1225–1231 (1981), Ellis et al. describe a sacrificial anode method to cause a rapid deposition of Prussian blue thin film. The rate of deposition is dramatically increased by attaching an iron or copper wire to the electrode and inserting it into the solution.

In "Electrochemical Properties of Amorphous Prussian Blue Films Chemically Deposited from Aqueous Solutions" by Yano et al., *Proceedings of the Symposium on Electrochromic Materials*, 90-2, pp. 125–136 (1990), amorphous Prussian blue films are described as being formed on transparent electrodes by adding hypophosphorous acid to a solution of ferric-ferrocyanide. The method is effective for preparation of a uniform Prussian blue film over a large area. The electrochromic properties of a Prussian blue film are compared with those of crystalline Prussian blue film prepared electrochemically. Application of an electric voltage gave rise to reversible color changes only for Prussian blue in aqueous solution containing lithium, sodium and barium salts.

In "Electrochemical Oxidation and Reduction of Thin Films of Prussian Blue", *Journal of the Electrochemical Society*, Vol. 125, pp. 886–887 (1978), Neff describes the electrochemical behavior of thin films of Prussian blue, while in "Ion Flux During Electrochemical Charging of Prussian Blue Films", *Journal of Electroanalytical Chemistry*, Vol. 234, pp. 213–227 (1987), Feldman et al. disclose the incompatibility of Prussian blue with protons.

In "Prussian Blue-Nafion Composite Film and Its Application to a Thin Film Rechargeable Battery," *Progress in Batteries and Solar Cells*, Vol. 6, pp. 255–256 (1987), Honda et al. describe the preparation and structure of Prussian blue-Nafion composite films. The electrochemical properties are also described, and it is disclosed that Prussian blue-Nafion ® has the interesting property of being an electrochromic material. The color of Prussian blue-Nafion ® is reversibly changed by applying a bias voltage.

SUMMARY OF THE INVENTION

The present invention provides an electrochromic device with rapid electrochromic switching by using a complementary configuration so that the device can operate at low applied voltage without undergoing undesirable reactions which form bubbles, thus being suitable for repeated cycling use such as a window or mirror. The solid-state electrochromic device of the present invention includes a tungsten oxide-Prussian blue couple, which can achieve a deep switching cycle without forming bubbles, in combination with a solid polymer proton-conducting electrolyte. This configuration allows both electrochromic layers to color and bleach simultaneously. The essence of the invention is coupling a proton-conducting solid polymer electrolyte with a Prussian blue counterelectrode.

DESCRIPTION OF PREFERRED EMBODIMENTS

Figure 1:
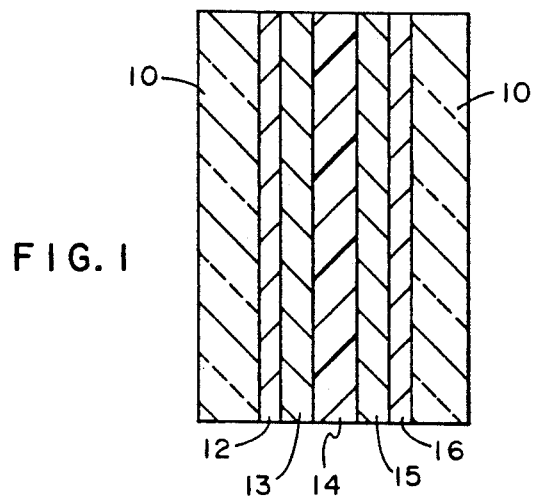
FIG. 1 illustrates an electrochromic device comprising two transparent substrates 10, a transparent conductor 12, an electrochromic material 13, an electrolyte 14, a complementary electrochromic material 15, and a transparent conductor 16.

In a preferred embodiment of the present invention, the electrochromic cell is a transparent laminate comprising two transparent glass substrates. One electrode of the cell comprises one of the glass substrates coated with an electroconductive film, preferably tin oxide having a resistivity of about 25 ohms per square or less. The electrochromic film, preferably tungsten oxide, is deposited over the conductive film, preferably by evaporation or sputtering to a preferred thickness of about 1000 to 4000 Angstroms. The second glass substrate is preferably also coated with a conductive film, preferably tin oxide. The complementary electrochromic film, preferably Prussian blue, is deposited on the conductive film, preferably by a sacrificial anode deposition method, to a preferred thickness of 1500 to 5000 Angstroms.

The electrochromic film/conductive film coated glass plates are preferably spaced about 0.030 inch (about 0.76 millimeter) apart. Disposed in this space is an ion-conductive material, a proton-conductive polymer in accordance with the present invention. Preferred proton-conductive polymers include homopolymers of 2-acrylamido-2-methylpropane sulfonic acid and copolymers of vinyl sulfonic acid and vinylpyrrolidone, as described in copending application U.S. Ser. No. 07/633,870 filed on even date herewith by T. G. Rukavina, as well as poly(styrene-sulfonic acid), polyvinyl sulfonic acid and Nafion ® fluorinated copolymers.

The cell voltage in accordance with the present invention is sufficiently low so that the following electrolysis reactions of water, with concurrent evolution of gas which can form bubbles, do not occur:

| Electrode | Reaction | Standard Potential |
|---|---|---|
| Anode | $2H_2O \longrightarrow 4H^+ + O_2 + 4e^-$ | −1.229 volts |
| Cathode | $2H_2O + 2e^- \longrightarrow H_2 + 2OH^-$ | −0.828 volt |

Instead, the Prussian blue counter electrode participates in a balancing half-cell reaction as follows:

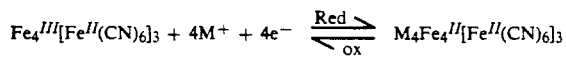

where $M^+$ can be $Li^+$, $Na^+$, $K^+$ or $Cs^+$ ions. In the present invention, $M^+$ may include $H^+$. It is generally known that $H^+$ possesses the highest mobility among various single valency cations. However, incompatibility of proton with Prussian blue has been widely shown previously in solution, and compatibility has not been demonstrated in solid state. The compatibility of Prussian blue with protons in the solid state is essential to the present invention. This compatibility opens up a range of intriguing possibilities in electrochromic technology.

A tin oxide coated glass having a sheet resistance of 25 ohms/square (NESA ® coated glass, a product of PPG Industries, Inc.) is used as a working electrode. The tin oxide coated glass substrates ($5.1 \times 7.6 \times 0.5$ cm$^3$ and $12.5 \times 17.8 \times 0.5$ cm$^3$) are precleaned ultrasonically for 15 minutes in an aqueous solution of Dart 210 cleaner from Madison Chemical Co. The actual cleaning solution is prepared from concentrate diluted with distilled water to pH=3.0. During ultrasonic cleaning, the bath is heated to a temperature of 60° C. After cleaning, the substrate is rinsed with distilled water and then dried with extra dry $N_2$ gas.

Tungsten oxide films are prepared by resistive evaporation beginning at $6 \times 10^{-6}$ Torr. The source material is $WO_3$ powder (purity>99.9 percent, Li Tungsten Corporation) contained in an $Al_2O_3$-coated tungsten boat. In advance, the substrate is precleaned by argon ion sputtering. No substrate preheating is provided. The thickness of the $WO_{3-y} \cdot mH_2O$ film is controlled with a quartz crystal monitor at $3700 \pm 500$ Å. Film thickness control is based on multiple beam interferometry, using an Å-scope (Ångstrom Technology). X-ray diffraction analysis, with a Rigaku diffractometer (Model D-2655) using a monochromatized Cu K alpha incident radiation, shows all the films to be lacking crystallinity. Conductive copper bus bars are applied on two sides of the tungsten oxide coated surface.

Two methods may be used to form Prussian blue on conducting glass. For a small cell, the electrodeposition method described in the prior art may be used. The solution contains 5.0 mM of $FeCl_3 \cdot 6H_2O$ and 5.0 mM of $K_3Fe(CN)_6$. It takes about 5 minutes to deposit Prussian blue on the NESA glass. However, this electrochemical method is not suitable for forming Prussian blue films over a large area because of the nonuniform film thickness which accompanies the potential drop across the conducting substrate. The uniform electroless deposition method to overcome this drawback disclosed by Yano et al. usually takes about 4–5 hours to grow the same amount of Prussian blue as formed by the electrodeposition method. The electroless method is improved in accordance with the present invention to accelerate the deposition rate, so that coating time is comparable to that of the electrodeposition method. The solution used in the modified deposition of the present invention contains 5.0 mM of $FeCl_3 \cdot 6H_2O$, 5.0 mM of $K_3Fe(CN)_6$ and 2.5 mM of $H_3PO_2$. The modified method incorporates a conducting bus bar system on a conducting glass substrate during substrate immersion, which facilitates the deposition rate through an instantaneous redox reaction. This rapid deposition takes only about 10 minutes to form Prussian blue. The thickness of the Prussian blue film, preferably 1,500 to 5,000 Å, is controlled by the dipping time. X-ray diffraction analysis, with a Rigaku diffractometer (Model D-2655) using a monochromatized Cu K alpha incident radiation, shows all the films to be crystalline.

A preferred transparent electrolyte is poly(2-acrylamido-2-methylpropane sulfonic acid) produced by the electrolyte polymerization procedures described in U.S. Pat. No. 4,375,318. Ion conductivity of the polymer electrolyte at room temperature is estimated to be approximately $10^{-3}$ ohms$^{-1}$ cm$^{-1}$. Preferred ion-conducting polymer sheets are described in copending U.S. application Ser. No. 07/440,832 filed Nov. 24, 1989, by Rukavina et al., the disclosure of which is incorporated herein by reference.

A homopolymer of 2-acrylamido-2-methylpropane sulfonic acid is made by adding 65.51 grams of AMPS ® monomer (Lubrizol Corporation), 70.00 grams of deionized water and 0.49 gram of tetraethylene glycol diacrylate (Sartomer Co.) to a flask equipped with a magnetic stirrer. The mixture is evacuated at 27 inches of mercury for 15 minutes. Immediately after, a 0.12 gram of 20 percent benzoin methyl ether (Polysciences, Inc.) is added and mixed thoroughly. During the course of mixing, the flask is again under vacuum and maintained at 27 inches of mercury. Nitrogen gas is introduced to the flask at the end of mixing to release vacuum. The monomer mixture is cast between two release plies of plastic film in a glass mold. A cure is accomplished by exposing each side to UV lamps. The peak of the UV spectrum is 360–390 nanometers. Exposure at the glass casting cell per side during horizontal travel under UV lamps averages $3500 \pm 200$ mJ/cm$^2$. Each side is exposed for 3 minutes. After removing the sheet from its glass-supported casting mold, one release layer is stripped away to begin conditioning. Conditioning is done in a room with controlled relative humidity of approximately 58 percent at room temperature, which is 23° C. Once the sheet is sufficiently dry (tack-free), the remaining release layer is also peeled away. The freestanding polymer sheet is then allowed to equilibrate to the desired water content, which is 3.50 molar ratio of water to AMPS monomer. This corresponds to ionic conductivity of about $10^{-3}$ ohms$^{-1}$cm$^{-1}$ at room temperature. Before assembling the cell, the tungsten oxide electrode is precharged with protons. The precharging is carried out in an acidic solution containing 0.1N HCl. Constant current of 0.1 mA/cm$^2$ is used in charging or cathodizing the tungsten oxide electrode. It takes about 4 minutes to get the proper amount of protons into the tungsten oxide thin film. The blue tungsten bronze, $H_xWO_{3-y}$, is then rinsed with the distilled water and dried under $N_2$. Pressian blue and $H_xWO_{3-y}$ electrodes are laminated with a proton conducting polymer electrolyte.

The working and counter electrodes are laminated together with a layer of proton-conducting polymer electrolyte. The polymer electrolyte is cast at 30 mils (about 0.76 millimeter). There is about 15 percent shrinkage upon conditioning. The lamination process is carried out in an autoclave at a pressure of 150 pounds per square inch and a temperature of 93° C. for one hour.

The coloration and bleaching of the cell are carried out by applying a constant dc voltage using, for example, a Keithley Voltage/Current Source, Model 228A. The transmittance, current and drift of the cell voltage are recorded. The change is optical transmittance during coloration and bleaching is measured at 550 nm with a Cary-14 spectrophotometer, thus confirming the compatibility of a proton-conducting polymer electrolyte with Prussian blue.

The present invention will be further understood from the description of the examples which follow:

EXAMPLE I

A transparent electrochromic cell is prepared using two glass cell members. Both glass substrates are clear 3 millimeter thick float glass coated with a tin oxide film having a resistivity of 25 ohms per square. The conductive tin oxide coated glass member functions as an electrode, with a silver frit bus bar applied about the periphery. An electrochromic tungsten oxide film $WO_{3-y}$.m-$H_2O$, wherein m represents the extent of hydration and y represents oxygen deficiency, is deposited over one conductive tin oxide film by resistive evaporation at an initial vacuum chamber pressure of about $4 \times 10^{-6}$ Torr. The electrochromic tungsten oxide film is deposited to a thickness of about 4000 Angstroms. A film of Prussian blue is deposited on the other tin oxide coated glass substrate by electrochemical deposition.

On the scale of a 3.5 cm $\times$ 4.0 cm viewing area, electrochemical stability of at least 20,000 cycles at room temperature is achieved, with cycling at $\pm 1.0$ and $\pm 1.5$ volts. The initial transmittance at 550 nm during bleaching goes from 8 percent to 52 percent in about 30 seconds; decreasing from 52 percent to 8 percent during darkening in about 15 seconds. This rapid electrochromic switching is accomplished by using a proton-precharged tungsten oxide ($H_xWO_3$)-Prussian blue couple and a proton-conducting polyAMPS electrolyte with molar ratio of water to AMPS monomer of 3.50. The device achieves a deep switching without forming bubbles under repeated cycling. This electrochromic transparency, of electrically conductive glass/$H_xWO_{3-y}$.m-$H_2O$/solid polymer electrolyte/Prussian blue/electrically conductive glass, hereafter referred as $H_xWO_{3-y}$/Poly-AMPS/PB, is based on complementary electrochemistry.

The above described cell develops residual color (discoloration) at the end of 1,000 continuous cycles with $\pm 1.0$ volt powering. discoloration becomes very evident at the end of 5,140 cycles. Nevertheless, the drop in the bleached state transmittance is fully recovered by applying a higher voltage ($\pm 1.5$ volts). Another sample is fabricated with a modified Prussian blue electrode by incorporating Prussian blue into a porous sol-gel coating on conducting glass. The sol-gel is prepared according to U.S. Pat. No. 3,941,719 to Yoldas, which is herein incorporated by reference, and is spin-coated on the conducting glass at 2000 rpm for 30 seconds. This also shows discoloration, after 6,090 continuous cycles with $\pm 1.0$ volt powering. Again, the loss in the bleached state transmittance is fully recovered by applying a higher voltage ($\pm 1.5$ volts). The sol-gel coating improves the life expectancy of the device, possibly because the sol-gel coating improves adhesion between Prussian blue and the conductive glass.

EXAMPLE II

For a large electrochromic device with the scale of a 11.5 cm $\times$ 15.5 cm viewing area (active area = 180 cm$^2$), the electrochemical film deposition method is not suitable for forming Prussian blue films. Electrochromic windows based on tungsten oxide/Prussian blue are scaled up to a 5 inch $\times$ 7 inch size (active area = 180 cm$^2$). Prussian blue is deposited on tin oxide coated glass (Sungate ® 300 glass from PPG Industries) by using the modified sacrificial anode method with the reducing agent. The Prussian blue electrode is rinsed with the distilled water and dried with nitrogen before use. The tungsten oxide thin film is coated on the oxide coated substrate (NESA glass from PPG Industries) by vacuum deposition. An electrochromic cell is constructed as in Example I.

Figure 2:
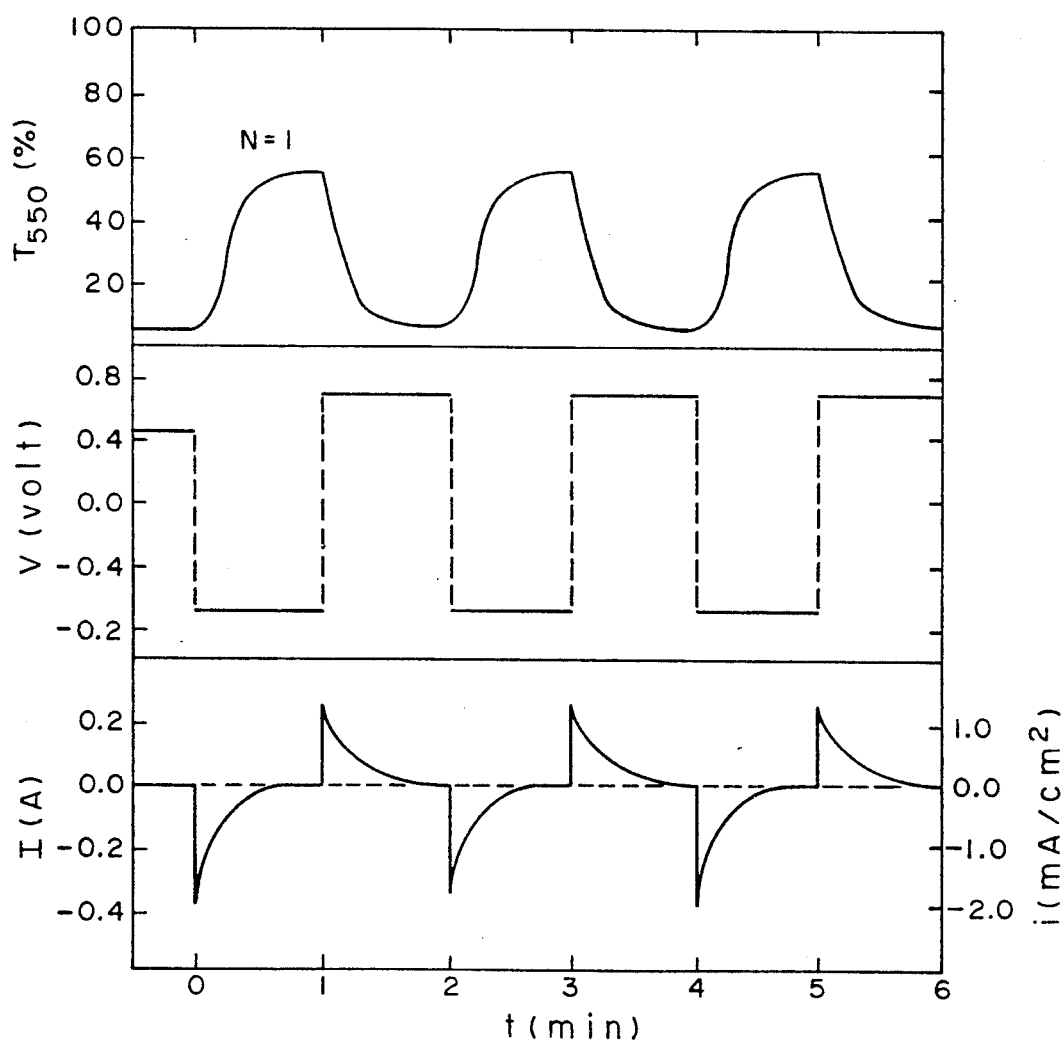
FIG. 2 illustrates the first three cycles of transmittance and current during cyclic potentiostatic switching of an electrochromic device of the present invention.

Cells all switch at low voltage ($\pm 0.7$ volt) within one minute both in the darkening and bleaching cycles. The transmittance and current during cyclic potentiostatic switching is presented in FIG. 2 for an active area of 180 cm$^2$ for the first three cycles. The voltage is the potential difference between the Prussian blue electrode and the tungsten oxide electrode, and is $\pm 0.7$ volt for darkening and $-0.7$ volt for bleaching. The transmittance at 550 nm during bleaching goes from 5 percent to 55 percent in about 1 minute, and decreases from 55 percent to 5 percent during darkening in about 45 seconds.

EXAMPLE III

Stabilization of the performance of the cell at room temperature is achieved with a third electrode, a platinum wire, by refreshing and preventing the drift of the bleached state transmittance. The performance can be stabilized for at least 10,000 cycles at room temperature with an alternating cycling/refreshing operation. This is done by intermittently charging the Prussian blue and platinum electrode following periods of cycling. The rejuvenating process requires a sustained bias of 2.0 VDC between the platinum and Prussian blue electrode. A comparison of the transmittance change at 550 nm for cells made without and with a third electrode is summarized below.

| Effect of Refreshing on Switching | | | |
|---|---|---|---|
| | Room Temp. Switching (% Transmittance at 550 nm) | | |
| Configuration/Cycle No. | N = 1 | N = 1,000 | N = 10,000 |
| Without third electrode | 55 ⇌ 4 | 40 ⇌ 6 | 28 ⇌ 9 |
| With third electrode | 58 ⇌ 5 | 56 ⇌ 8 | 55 ⇌ 11 |

EXAMPLE IV

In this example, stabilization of the bleached state transmittance is achieved without using the third electrode. This can be done by forming the Prussian blue electrode with better control of charge capacity to match the $H_xWO_3$ electrode. The capacity of the Prussian blue electrode can be controlled by counting the number of coulombs passing through the electrode during the deposition period. Prussian blue of active area of 180 square centimeters is formed on a tin oxide conducting substrate with 30 ohms per square sheet resistivity. The plating solution contains 20 mM of $FeCl_3.6H_2O$ and 20 mM of $K_3Fe(CN)_6$. Silver wire of 1 millimeter diameter is used as a sacrificial anode to cause the deposition of Prussian blue. The exposed length is 2.54 centimeters. The number of coulombs passed is controlled at 2.00. The process is carried out for about 7 minutes. The electrochromic cell is laminated with proton-conducting poly(2-acrylamido-2-methylpropane sulfonic acid) polymer electrolyte, with molar ratio of water to AMPS monomer of 3.50, in the manner previously described herein.

Figure 3:
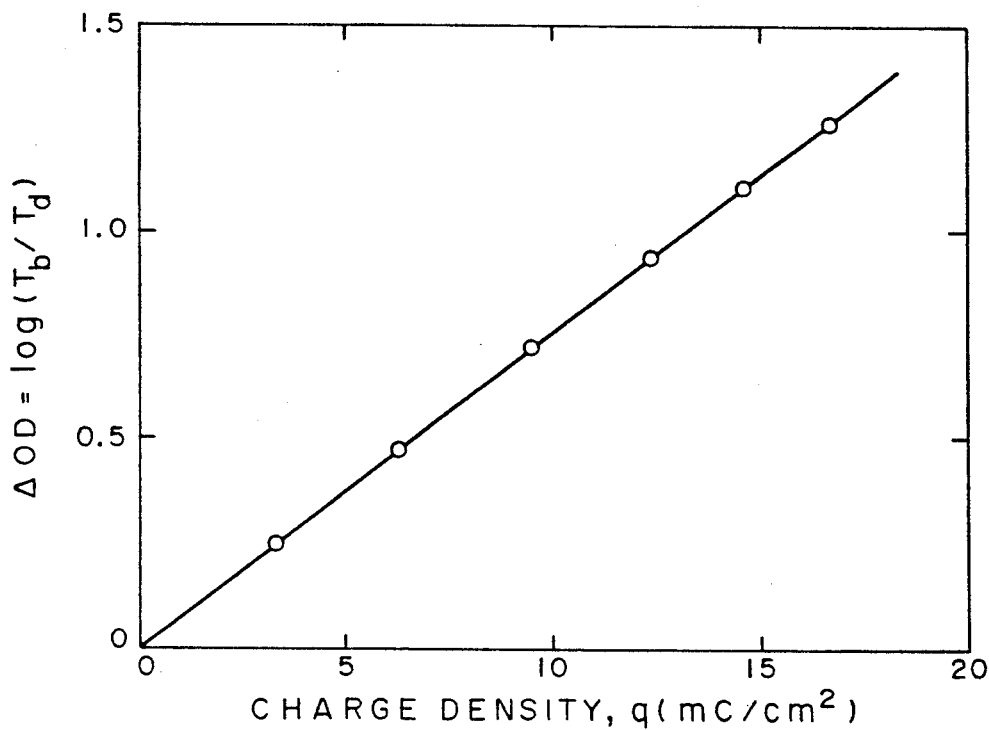
FIG. 3 illustrates the initial optical density change of 550 nm against the charge injected/extracted per unit area of an electrochromic device of the present invention.
Figure 4:
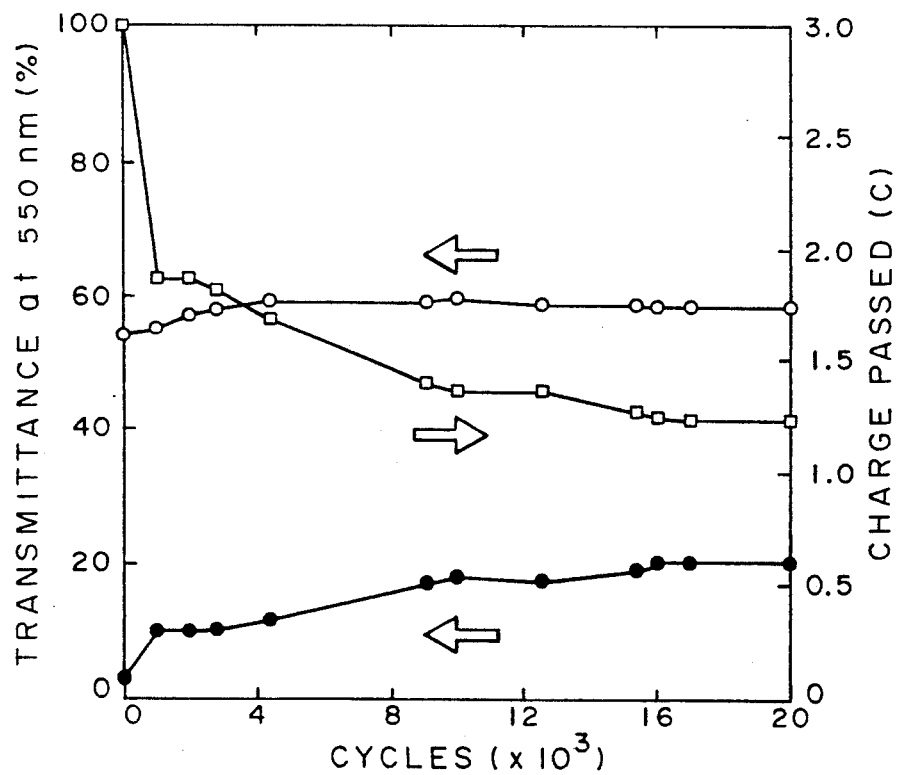
FIG. 4 shows the transmittance variation at 550 nm and passed charge over 20,000 cycles of an electrochromic device of the present invention.

This cell, with active areas of 180 square centimeters, based on $H_xWO_3$/polymer electrolyte/Prussian blue, is cycled more than 20,000 cycles at constant voltages and time intervals (darkening: 1.2 volts, 30 seconds, bleaching: −0.6 volts, 60 seconds). FIG. 3 plots the initial optical density change at 550 nonometers against the charge injected/extracted per unit area at room temperature. The coloration efficiency of the device is calculated from the slope and is 75.8 cm$^2$/C. FIG. 4 represents the transmittance variation at 550 nm and passed charge over 20,000 cycles. Initially, the cell transmittance at 550 nm decreases from 55 percent to 3 percent in 30 seconds, bleaches from 3 percent to 55 percent in 60 seconds. The transmittance varies from 59 percent⇌20 percent, with the same powering and timing, at the end of 20,000 cycles. Passed charge decreases by 55 percent over the span of 20,000 cycles.

The electrochromic material mentioned in the present invention is not limited to tungsten oxide. Any other cathodic coloring electrochromic materials may be employed, such as $MoO_3$, $Nb_2O_5$, $TiO_2$, $V_2O_5$ and other transition metal oxides.

The complementary electrochromic material mentioned in the present invention is not limited to Prussian blue itself. It can embody a composite material consisting of Prussian blue, such as polyaniline-Prussian blue composite films and sol-gel Prussian blue composite films.

Alternate complementary materials are described in copending U.S. application Ser. No. 07/633,894 filed on even date herewith by R. E. Spindler, the disclosure of which is incorporated herein by reference.

Alternate proton-conducting polymers are disclosed in copending U.S. application Ser. No. 07/633,870 filed on even date herewith by T. G. Rukavina, the disclosure of which is incorporated herein by reference, and copending U.S. application Ser. No. 07/440,832 filed Nov. 24, 1989, by Rukavina et al., the disclosure of which is incorporated herein by reference. A laminated and sealed electrochromic window can be produced in accordance with copending U.S. application Ser. No. 07/415,001 filed Sep. 29, 1989, now U.S. Pat. No. 5,124,832 by Greenberg et al., the disclosure of which is incorporated herein by reference.

The scope of the present invention is defined by the following claims.

I claim:

1. An article having variable transmittance in response to an electric field comprising:
   a. a transparent substrate;
   b. a transparent electroconductive electrode material;
   c. a transparent cathodic coloring electrochromic material;
   d. a transparent proton-conducting polymer electrolyte;
   e. a transparent complementary electrochromic material comprising prussian blue; and
   f. a transparent electroconductive counterelectrode material.

2. An article according to claim 1, wherein the electroconductive material is selected from the group consisting of metal oxide films.

3. An article according to claim 2, wherein the electroconductive material is selected from the group consisting of tin oxide, indium oxide and mixtures thereof.

4. An article according to claim 1, wherein the transparent electrochromic material is selected from the group consisting of tungsten oxide and molybdenum oxide.

5. An article according to claim 4, wherein the transparent electrochromic material is tungsten oxide.

6. An article according to claim 1, wherein the transparent substrate is glass.

7. An article according to claim 1, wherein the polymer electrolyte is selected from the group consisting of poly(2-acrylamido-2-methylpropane sulfonic acid), poly(styrene-sulfonic acid), polyvinyl sulfonic acid, and fluorinated copolymers.

8. An article according to claim 7, wherein the polymer electrolyte is poly(2-acrylamido-2-methylpropane sulfonic acid).

* * * * *